(12) United States Patent
Boletis et al.

(10) Patent No.: US 9,533,383 B2
(45) Date of Patent: Jan. 3, 2017

(54) METHOD FOR REPAIRING A FLANGE OF A HOUSING

(75) Inventors: Yannis Boletis, Paris (FR); Jean-Louis Cardinal, Savigny le Temple (FR); Serge De Sanctis, Montreuil (FR); Julien Tran, Pontoise (FR)

(73) Assignee: SNECMA, Paris (FR)

( * ) Notice: Subject to any disclaimer, the term of this patent is extended or adjusted under 35 U.S.C. 154(b) by 718 days.

(21) Appl. No.: 13/577,517

(22) PCT Filed: Jan. 28, 2011

(86) PCT No.: PCT/FR2011/050182
§ 371 (c)(1),
(2), (4) Date: Aug. 7, 2012

(87) PCT Pub. No.: WO2011/098705
PCT Pub. Date: Aug. 18, 2011

(65) Prior Publication Data
US 2012/0301286 A1     Nov. 29, 2012

(30) Foreign Application Priority Data
Feb. 10, 2010   (FR) .................... 10 00555

(51) Int. Cl.
*B23P 6/00*     (2006.01)
*F01D 25/24*    (2006.01)

(52) U.S. Cl.
CPC ............ *B23P 6/005* (2013.01); *F01D 25/243* (2013.01); *F05D 2230/80* (2013.01); *Y02T 50/672* (2013.01); *Y10T 29/49746* (2015.01)

(58) Field of Classification Search
CPC ............ B23P 6/005; B23P 9/00; B23P 6/002; F01D 25/243; F01D 5/005; Y10T 29/49746; Y10T 29/49318; Y02T 50/672; F05D 2230/80
USPC ...................................... 29/402.11
See application file for complete search history.

(56) References Cited

U.S. PATENT DOCUMENTS

| 5,606,797 A | 3/1997 | Reynolds |
| 6,148,517 A * | 11/2000 | Johnson et al. ............. 29/889.1 |
| 2002/0017361 A1* | 2/2002 | Walker et al. ................ 156/242 |
| 2003/0118419 A1* | 6/2003 | Easterbrook et al. ........... 411/1 |

(Continued)

FOREIGN PATENT DOCUMENTS

| EP | 1 959 094 | 8/2008 |
| EP | 2 022 600 | 2/2009 |

(Continued)

OTHER PUBLICATIONS

International Search Report Issued May 12, 2011 in PCT/FR11/50182 Filed Jan. 28, 2011.

*Primary Examiner* — Dwayne J White
*Assistant Examiner* — Adam W Brown
(74) *Attorney, Agent, or Firm* — Oblon, McClelland, Maier & Neustadt, L.L.P.

(57) ABSTRACT

A method of repairing a flange of a casing, or a casing made of aluminum, for a turbine engine or an airplane turboprop or turbojet, the flange including at least one through hole for passing a bolt for fastening equipment. The method includes: forming a spot face in the flange around the hole for passing the bolt; anodizing the bottom surface of the spot face; placing a washer on the spot face; and fastening the washer to the flange using adhesive.

10 Claims, 2 Drawing Sheets

(56) References Cited

U.S. PATENT DOCUMENTS

| | | |
|---|---|---|
| 2005/0050705 A1* | 3/2005 | Segletes et al. .......... 29/402.13 |
| 2008/0193280 A1 | 8/2008 | Addis |
| 2009/0038739 A1 | 2/2009 | Holland et al. |
| 2009/0208691 A1* | 8/2009 | Whitworth et al. ............ 428/63 |
| 2009/0320288 A1* | 12/2009 | Yelistratov et al. ......... 29/889.1 |

FOREIGN PATENT DOCUMENTS

| | | |
|---|---|---|
| EP | 2022600 A1 * | 2/2009 |
| EP | 2 108 787 | 10/2009 |
| JP | 63 055369 | 3/1988 |
| JP | 10 183087 | 7/1998 |
| WO | 2007 133198 | 11/2007 |
| WO | 2010 007323 | 1/2010 |

* cited by examiner

METHOD FOR REPAIRING A FLANGE OF A HOUSING

The present invention relates to a method of repairing a flange of a casing, e.g. made of aluminum, for a turbine engine such as an airplane turboprop or turbojet.

For example, while a turboprop is in operation, its casing is subjected to vibration that can give rise, in the long run, to damage. For example, a low pressure compressor casing has a flange that is used in particular for fastening equipment and that includes numerous holes for passing bolts.

The mechanical stresses in those holes caused by the vibration of the casing give rise to bruising damage to the inside surfaces of the holes and to the plane surface of the flange against which the equipment or the equipment support is applied. Localized wear is thus observed at the surface of the flange in the zone where contact is made between the flange and the equipment or the equipment support, and an increase in the diameter of the hole and ovalization of its section are also observed.

In order to ensure that the turbine engine operates properly, it is necessary either to repair this damage or else to change the casing completely. The cost of a new casing is of the order of $170,000.

In order to repair such damage, it is known to build up material by welding so as to reconstruct the original shape of the holes and of the surface of the flange against which the equipment or the equipment support comes to bear.

When casings are made of aluminum or of composite material, and more generally out of non-weldable material, such a method cannot be used. As an alternative, material may be applied using an epoxy resin filled with glass fibers. That technique is used solely for restoring the original shape of holes, but it cannot be used for repairing a damaged zone of the surface of the flange against which the equipment bears. The compression strength of such resin is not sufficient to provide a rigid interface with the equipment assembled to the flange. In addition, when tightening the bolt, only the sound portion of the flange is capable of withstanding the compression forces. Since the sound bearing surface area that remains is smaller, the bruising pressure and the wear of the flange are increased. Thus, even after holes have been repaired, the casing will need to be changed shortly, because of the excessive wear of said surface of the flange.

In addition, such repair cannot be performed during an under-wing maintenance operation, but on the contrary requires the entire engine to be removed.

It should also be observed that regulations prohibit adding of a part in addition to the configuration that has been certified.

A particular object of the invention is to provide a solution to this problem that is simple, effective, and inexpensive.

To this end, the invention provides a method of repairing a flange of a casing, e.g. made of aluminum, for a turbine engine such as an airplane turboprop or turbojet, the flange including at least one through hole for passing a bolt for fastening equipment, the method being characterized in that it comprises the successive steps consisting in:

forming a spot face in the flange around the hole for passing the bolt;
   anodizing the bottom surface of the spot face;
   placing a washer on the spot face; and
   fastening the washer to the flange using adhesive.

The equipment or the equipment support can then bear against the washer, which is capable of withstanding the compression forces when the bolt is tightened, and that enables the bolt to be centered relative to the hole.

Since the washer is secured to the casing, it is not considered as constituting an additional part that is distinct from the casing, and therefore it complies with regulations.

Such a repair is inexpensive, fast, and can be performed directly during an under-wing maintenance operation.

In addition, anodizing guarantees that the adhesive will adhere.

Advantageously, the method includes a step of using dye penetration to inspect the spot face and/or the surface of the flange surrounding the outlet of the hole for passing the bolt.

In one possibility of the invention, the washer is adhesively bonded to the flange using a fiber glass-filled epoxy resin.

Such a resin provides good adhesion on anodized aluminum and on the washer, and does not give rise to corrosion of the flange material.

Preferably, the adhesive is applied at least against the bottom surface of the spot face.

The surface of the flange around the hole for passing the bolt may be previously prepared by belt-grinding, so as to obtain a good surface state.

Belt-grinding is a finishing technique that is simple and inexpensive, consisting in planing the surface using an abrasive belt.

In an implementation, the washer is made of a material that presents hardness greater than the hardness of the material of the casing, so as to better withstand bruising stresses in the zone of contact between the washer and the equipment or the equipment support.

According to a characteristic of the invention, the method includes a step of marking a reference on the casing, in the proximity of the washer, so as to provide traceability for the repair during future disassemblies or inspections of the casing.

In preferred manner, the outside diameter of the washer lies in the range 10 millimeters (mm) to 15 mm, the inside diameter of the washer being about 7 mm.

The dimensions of the washer thus provide a good compromise between reducing stresses on the face of the flange and ensuring that the flange is sufficiently strong after the spot face has been made. The greater the diameter of the washer, the smaller the above-mentioned stresses, but the greater the extent to which the flange is weakened by the spot facing.

The invention also provides a casing for a turbine engine such as an airplane turboprop or turbojet, the casing including an annular flange prepared by performing the method of the invention, the flange including at least one hole for passing a bolt that opens out into a spot face in which a washer is adhesively bonded.

The casing is made of aluminum, of steel, or of composite material.

The invention can be better understood and other details, characteristics, and advantages of the invention appear on reading the following description made by way of non-limiting example with reference to the accompanying drawings, in which:

FIGS. 1 and 2 show an annular flange 1 of an aluminum casing of a high-pressure compressor of a turbojet that has been damaged by mechanical stresses generated while the turbojet was in operation.

Figure 1:
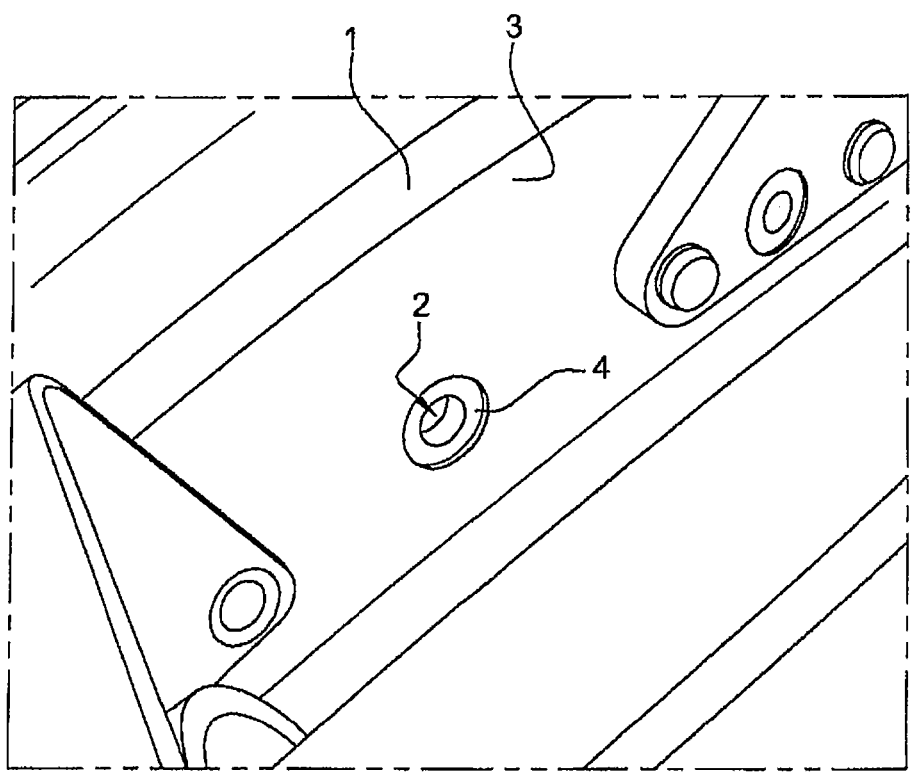
FIG. 1 is a perspective view of a portion of a damaged flange.
Figure 2:
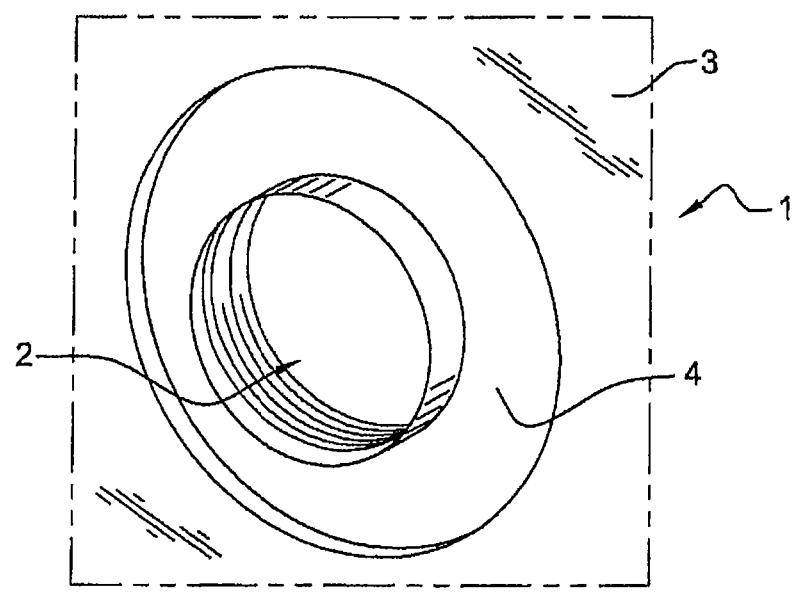
FIG. 2 is a view on a larger scale of the through hole in the damaged flange.
Figure 3:
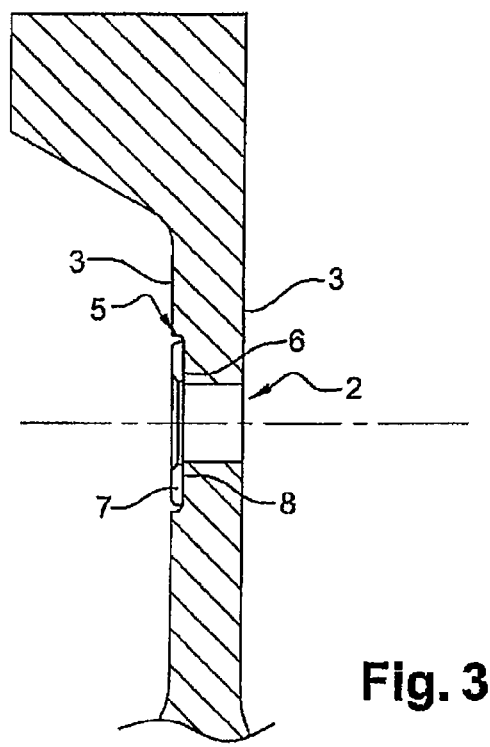
FIG. 3 is an axial section view through a flange portion that has been repaired by the method of the invention.
Figure 4:
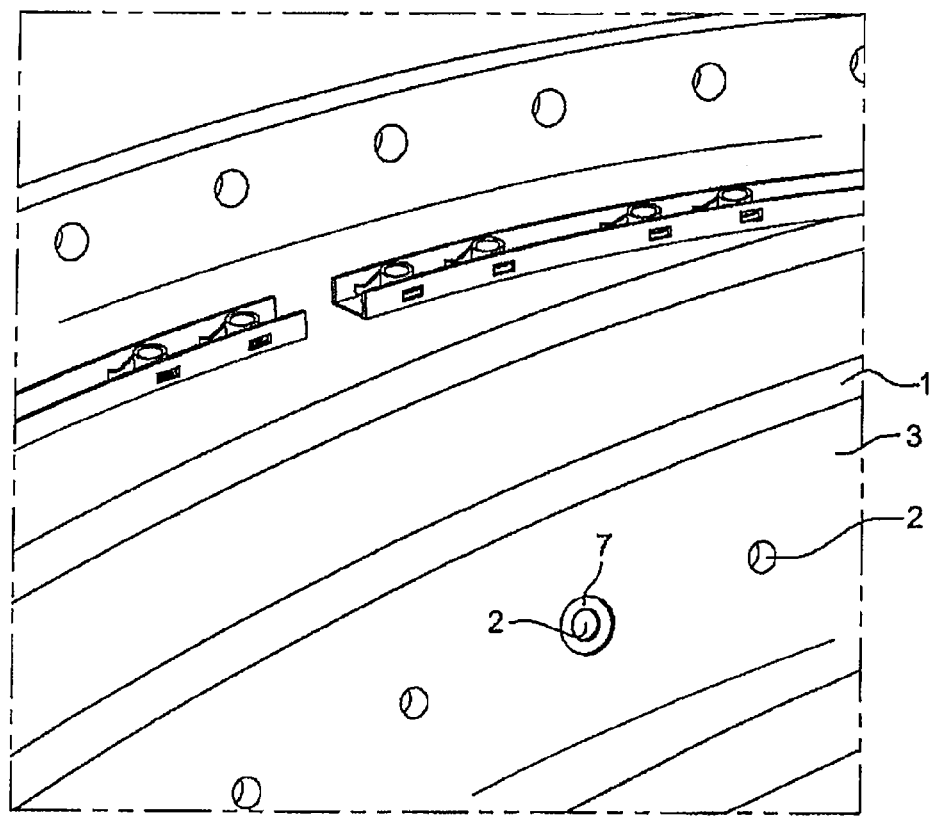
FIG. 4 is a fragmentary perspective view of the FIG. 3 flange.

The flange 1 has holes 2 formed near its circumference and regularly spaced apart from one another, the holes opening out at both ends into annular side surfaces 3. The holes 2 are used for passing bolts, for bolting stiffeners or pieces of equipment. In the example of FIGS. 1 and 2, the equipment (not shown) has a face of circular section that, when in use, bears against the corresponding side face 3 around the bolt-passing hole 2.

In operation, vibration of the casing can give rise to bruising damage 4 of the inside surfaces of the holes 2 and of the side surface 3 of the flange 1. There can thus be seen a localized indentation in the surface 3 of the flange 1 in the zone where contact is made between the flange and the piece of equipment, together with an increase in the diameter of the hole 2 and/or ovalizing of the section of the hole 2. All of these kinds of damage can clearly be seen in FIGS. 1 and 2.

In order to repair the flange 1 in the casing, the invention proposes a method comprising the following successive steps consisting in:
  preparing the surface 3 of the flange 1 around the bolt-passing hole 2 by belt-grinding;
  forming a spot face 5 in the flange 1 around the hole 2 for passing the bolt, the spot face 5 being of a diameter that is slightly greater than the diameter of the damaged zone 4;
  using dye penetration to inspect the surface state of the spot face 5 and/of the side surface 3 of the flange 1 surrounding the opening of the hole 2 for passing the bolt;
  anodizing the bottom surface 6 of the spot face 5;
  placing a flat washer 7 in the spot face 5;
  fastening the washer 6 to the flange 1 using epoxy resin 8 filled with glass fibers; and
  marking a reference on the casing in the proximity of the washer 7.

More particularly, the resin 8 is applied against the bottom surface 6 of the spot face 5. The resin used is preferably that sold by the supplier Henkel under the reference Hysol EA9394.

In addition, the washer 7 is made of a material presenting hardness greater than that of the material of the casing, e.g. made of an alloy of the A286 type.

The outside diameter of the washer 7 lies in the range 10 mm to 15 mm, its inside diameter is about 7 mm, and its thickness lies in the range 0.8 mm to 1.3 mm. The dimensions of the washer 7 are defined in particular as a function of the wear of the flange 1.

In the situation described above, the casing is made of aluminum. Naturally, the method of the invention may also be applied to casings made of composite material or of steel. Nevertheless, under such circumstances, the anodizing step is not necessary.

The washer 7 forms a rigid bearing surface that is secured to the casing for engaging the equipment or the equipment support, and it serves to center the bolt relative to the hole 2 without the need to enlarge the interior wall of the hole for repair.

The cost of such a repair is about 70 dollars, which is negligible compared with the cost of replacing the damaged casing with a new casing.

In addition, as mentioned above, the repair can be performed directly under the wing, without it being necessary to remove the engine when performed only on one side of the flange.

It should also be observed that the method makes it possible, after repair, to use bolts that are identical to those that were used before repair.

The invention claimed is:

1. A method of repairing a damaged zone in a flange of a casing made of aluminum, for a turbine engine or an airplane turboprop or turbojet, the flange including at least one through hole for passing a bolt for fastening equipment, the method comprising:
  identifying a damaged zone of localized indentation in a plane side surface of the flange around a damaged through hole of said at least one through hole, said damaged through hole having bruising on an inside surface thereof and having a sectional shape which is altered from an original shape of the through hole;
  forming a spot face in the damaged zone of localized indentation in the plane side surface of the flange around the damaged through hole without restoring the original shape of the inside surface of the damaged through hole, the spot face in the plane side surface of the flange being of a diameter that is greater than the diameter of the damaged zone of localized indentation;
  anodizing a bottom surface of the spot face;
  placing a flat washer on the spot face, the flat washer being made of a material having a hardness greater than that of the material of the casing; and
  fastening the flat washer to the flange using adhesive such that the flat washer serves to center the bolt relative to the damaged through hole.

2. A method according to claim 1, wherein, prior to performing the anodizing, the method further comprises using dye penetration to inspect the spot face and/or a surface of the flange surrounding an outlet of the damaged through hole.

3. A method according to claim 1, wherein the washer is adhesively bonded to the flange using a fiber glass-filled epoxy resin.

4. A method according to claim 1, wherein the adhesive is applied at least against the bottom surface of the spot face.

5. A method according to claim 1, wherein a surface of the flange around the damaged through hole is previously prepared by belt-grinding.

6. A method according to claim 1, further comprising marking a reference on the casing, in proximity of the flat washer.

7. A method according to claim 1, wherein an outside diameter of the flat washer lies in a range of 10 mm to 15 mm, an inside diameter of the flat washer being about 7 mm.

8. A casing for a turbine engine or an airplane turboprop or turbojet, the casing being made of aluminum, or steel, or of a composite material, and including an annular flange prepared by performing the method according to claim 1, the flange including at least one damaged through hole for passing a bolt that opens out into a spot face in which a washer is adhesively bonded.

9. The method of repairing an aircraft comprising performing the method of claim 1 directly under the wing of the aircraft without removing an engine of the aircraft.

10. The method of claim 1, wherein said altered sectional shape comprising at least one of an increased diameter and ovalizing.

* * * * *